United States Patent [19]

Williams

[11] Patent Number: 4,640,643

[45] Date of Patent: Feb. 3, 1987

[54] SIDEWALL EXTENSION FOR DRAIN CHANNEL SYSTEM AND METHOD FOR EXTENDING THE CONTINUOUS SLOPE OF A DRAINAGE CHANNEL SYSTEM

[75] Inventor: Barry C. Williams, Statesville, N.C.

[73] Assignee: Polydrain, Inc., Troutman, N.C.

[21] Appl. No.: 746,258

[22] Filed: Jun. 19, 1985

[51] Int. Cl.$^4$ .............................................. E01F 5/00
[52] U.S. Cl. ........................................ 404/4; 210/164; 405/118
[58] Field of Search ........................ 405/43, 45, 48, 51, 405/121, 124, 126, 118–120; 404/2–5, 25, 26; 210/164, 163

[56] References Cited

U.S. PATENT DOCUMENTS

| | | | |
|---|---|---|---|
| 2,386,020 | 10/1945 | Wendelken | 404/2 |
| 3,225,545 | 12/1965 | Flegel | 404/2 X |
| 4,498,807 | 2/1985 | Kirkpatrick et al. | 405/43 |
| 4,515,498 | 5/1985 | Thomann et al. | 404/4 |

FOREIGN PATENT DOCUMENTS

| | | | |
|---|---|---|---|
| 2254364 | 7/1974 | Fed. Rep. of Germany | 404/2 |
| 658097 | 10/1951 | United Kingdom | 404/4 |
| 662530 | 12/1951 | United Kingdom | 404/4 |

OTHER PUBLICATIONS

"Polydrain: Surface Drainage Made Simple", Polydrain, pp. 1–14, Sep. 1983.

Primary Examiner—Cornelius J. Husar
Assistant Examiner—Nancy J. Stodola
Attorney, Agent, or Firm—W. Thad Adams, III

[57] ABSTRACT

A drainage channel system is disclosed which is characterized by a plurality of drainage channel segments (30) of progressively greater length adapted to be interlocked end-to-end. Each channel segment (30) comprises a pair of opposing, spaced-apart sidewalls (31), (32), a bottom wall (33) connecting the sidewalls (31), (32) adjacent one end and a top opening opposite bottom wall (33) defining a fluid entrance adapted to receive a grate (37). A sidewall extension (10) is provided for being mounted on top of each of the sidewalls of channel segment (30) along at least a part of the length thereof to effectively increase the total depth of each channel segment (30) and increase the length of a continuously and progressively sloping run of the drainage channel system.

23 Claims, 5 Drawing Figures

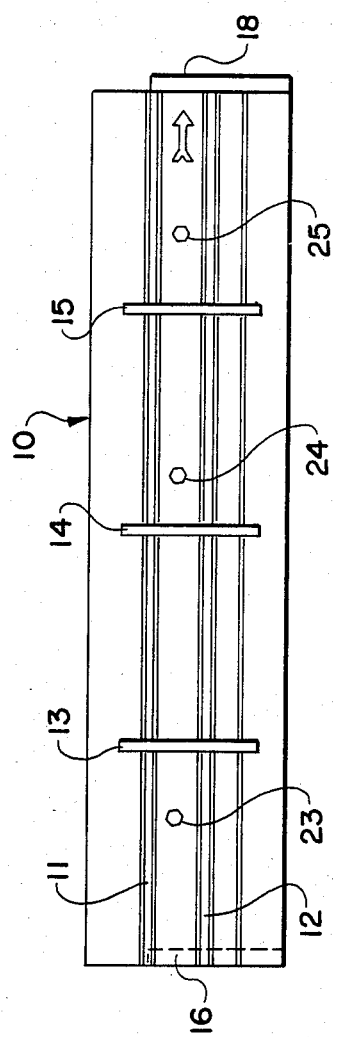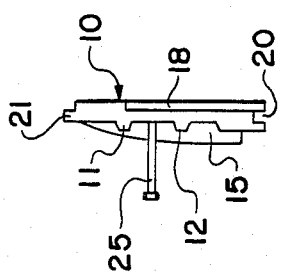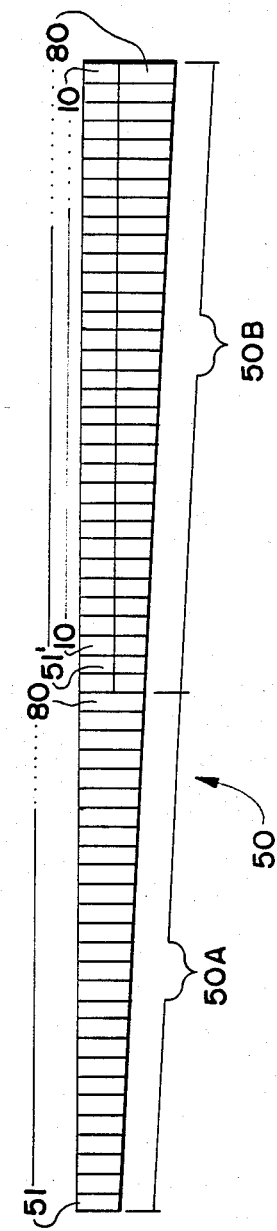

SIDEWALL EXTENSION FOR DRAIN CHANNEL SYSTEM AND METHOD FOR EXTENDING THE CONTINUOUS SLOPE OF A DRAINAGE CHANNEL SYSTEM

TECHNICAL FIELD AND BACKGROUND OF THE INVENTION

This invention relates to a drainage channel system which includes sidewall extensions for increasing the length of a continuous and progressive sloping run of the drainage channel system, and a method for extending the continuous slope of a run of a drainage channel system. Drainage channels of the type referred to in this application are open top drainage channels which are used to drain, for example, parking lots, airport runways, taxiways and ramps, and driveways. Such drainage channel systems also are used in various interior drainage applications. Usually, a longitudinally extending grate is set into the open top of the drainage channel.

Both the channel itself and the grate may be constructed of various materials according to various processes to support light, medium or heavy loads. In the particular embodiment discussed in this application, the drainage channels and sidewall extensions are cast of "polyester concrete." Polyester concrete is a concrete aggregate material containing quartz and inert mineral fillers bonded together with polyester resin.

A drainage channel "run" is formed by using cast channel segments having successively higher walls so that when connected together end-to-end in the proper order in a gradually deepening trench they collectively form a run having a 0.6% slope, as described above.

The channel segments are embedded in concrete within a trench which must be properly prepared to receive the channel segments in proper order and with proper slope.

One conventional system of constructing a drainage channel involves the use of 30 interlocking channel segments, each approximately one meter in length with a built-in slope of 0.6%. Accordingly, a single, continuously sloping, uninterrupted run of approximately 30 meters can be constructed simply by interconnecting these channel segments of gradually increasing depth end-to-end. However, in many applications longer runs are necessary. Heretofore, longer runs have been achieved by placing oppositely directed falls adjacent to each other with multiple outlets. Runs have also been extended by interspersing non-sloping channels throughout the length of the run. However, the maximum rate of fluid flow either remains the same, or in some cases is decreased, by using one of these methods.

Of course, a continuous run can be made longer simply by making more and more channel segments, each having a greater depth. However, there are several reasons why one cannot simply increase the depth of the individual channel segments indefinitely. Increasing the number of channel segments increases the number of segments which must be maintained in inventory. In addition, as the sidewalls of the channel segments increase in length, correspondingly more material is used and the finished product is substantially heavier, but nevertheless more subject to breakage during handling. Since such oversized channel segments would be used only in projects calling for a longer than normal run, the cost per unit for such oversized segments would be very high.

SUMMARY OF THE INVENTION

Therefore, it is an object of the invention to provide a sidewall extension for being mounted on top of opposing sidewalls of interlocked channel segments along at least a part of the length of a sloping run to effectively increase the total depth of each channel segment and increase the length of a continuously and progressively sloping run of the drainage channel system.

It is another object of the present invention to provide a drainage channel sidewall extension which greatly increases the maximum rate of flow of the drainage channel system.

It is yet another object of the present invention to provide a method for extending the continuous slope of a run of a drainage channel system mounted on top of and fixed to opposing side walls of relatively short channel segments, wherein the combined height of the sidewall extensions and sidewalls of the channel segments collectively define a fluid entrance at the same level as adjacent, taller channel segments.

These and other objects of the present invention are achieved in the preferred embodiment disclosed below by providing the combination of a sidewall extension for being mounted on top of each of the sidewalls of interlocked channel segments along at least a part of the length of the sloping run of the channel segments, and effectively increasing the total depth of each channel segment and increasing the length of a continuously and progressively sloping run of the channel system.

Preferably, the sidewall extensions are mounted on top of the channel segment sidewalls in substantially the same vertical plane as the channel segment sidewall. The top of the sidewalls of the channel segment and the bottom of the sidewall extension includes cooperating positioning means for positioning the sidewalls and the sidewall extensions together in the same vertical and longitudinal plane.

The sidewall extension also preferably includes locking means for locking adjacent, end-to-end sidewall extensions together in the same vertical plane. These locking means comprise a vertically extending tab integrally formed in one end of said sidewall extension, and the other end of the sidewall extension defining an integrally formed, mating slot for receiving and locking with the tab on the opposite end of an adjacent sidewall extension.

The sidewall extension also preferably includes at least one integrally formed support rib extending along its length and/or at least one integrally formed, vertically extending buttress for providing increased stiffness to the sidewall extension.

In the method according to the present invention, progressively taller channel segments are installed in a correspondingly progressively deeper trench, beginning at one end of a run with a channel segment having predetermined, relatively short sidewalls and continuing along the run with the installation of a predetermined number of channel segments having progressively taller sidewalls to a point before the end of the run. Then, a channel segment having relatively shorter walls is interlocked with the tallest channel segment already installed. A predetermined, vertically offset distance is defined between the fluid entrance of the channel segment having the tallest sidewalls and the adjacent channel segment having the relatively short sidewalls. Then, channel segments having progressively taller sidewalls are installed for a predetermined distance along the run to define a second predetermined number of channel segments. A sidewall extension is affixed on top of each of the opposing sidewalls of the second predetermined number of channel segments, with the sidewall extensions each being of a height sufficient to collectively define a fluid entrance at the same level along the continuation of the run for a predetermined distance to the end of the run.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 1 is a side elevational view of a sidewall extension according to the present invention;

FIG. 2 is an end elevational view of the sidewall extension illustrated in FIG. 1;

FIG. 5 is a schematic illustration of a first predetermined number of drainage channel segments defining a run, together with a second predetermined number of drainage channel segments, on the top of which are mounted sidewall extensions according to the present invention to thereby define a longer continuous run.

DESCRIPTION OF THE PREFERRED EMBODIMENT

Figure 3:
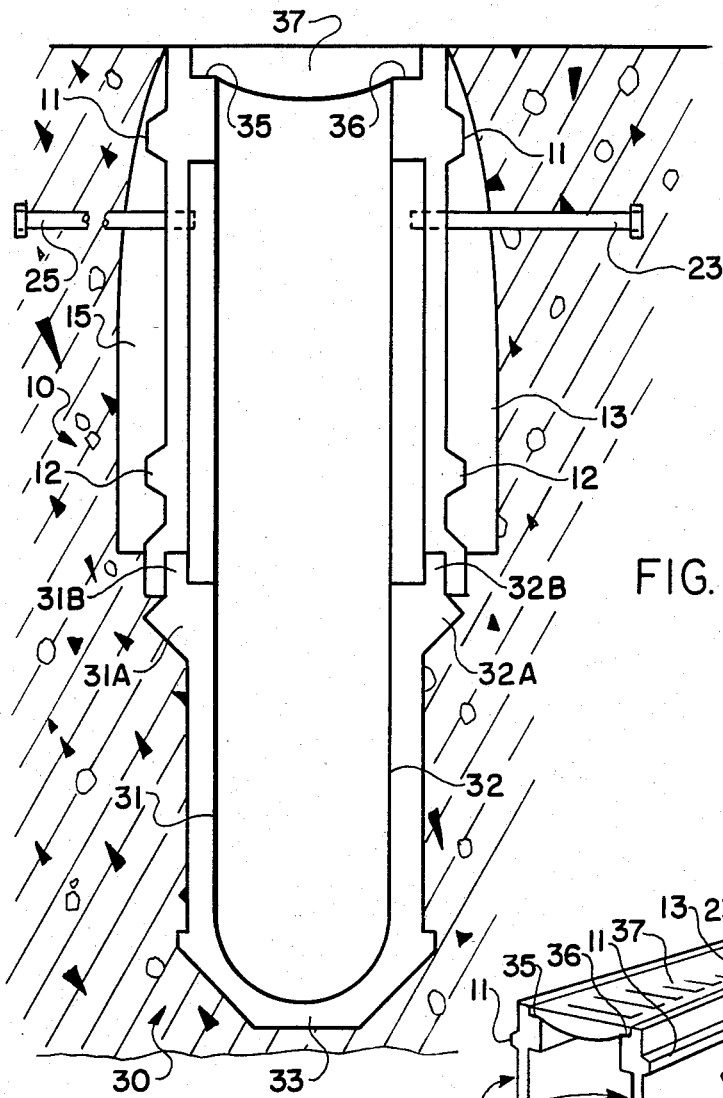
FIG. 3 is a vertical cross-sectional view of an installed drainage channel segment with two sidewall extensions according to the present invention mounted thereon.

Referring now specifically to the drawings, a sidewall extension according to the present invention is illustrated in FIG. 1 and generally designated by reference numeral 10. Sidewall extension 10 is cast of polyester concrete in the form of a relatively thin slab and includes a pair of integrally molded supporting ribs 11 and 12 extending horizontally along its length. In addition, three vertically extending buttresses 13, 14 and 15 are also integrally molded into sidewall extension 10 and provide further resistance against breaking.

A vertical slot 16 is molded into one end of each sidewall extension 10 and a matingly formed tab 18 is molded into the opposite end of each sidewall extension 10. Therefore, adjacent sidewall extensions 10 can be interlocked together by inserting tab 18 into the slot 16 of adjacently positioned sidewall extensions 10. This locks adjacent sidewall extensions 10 into the same vertical and horizontal plane.

Referring now to FIG. 2, a groove 20 is integrally formed into the bottom edge of sidewall extension 10 along its entire length. Likewise, a longitudinally extending ridge 21 is integrally molded into the top edge of sidewall extension 10. The function of groove 20 and ridge 21 are described below.

Three elongate anchor bolts 23, 24 and 25 are embedded into sidewall extension 10 and project outwardly therefrom at substantially right angles to the vertical plane of sidewall extension 10. These bolts assist in anchoring sidewall extension 10 into a bed of concrete into which the entire drainage system is installed.

Figure 4:
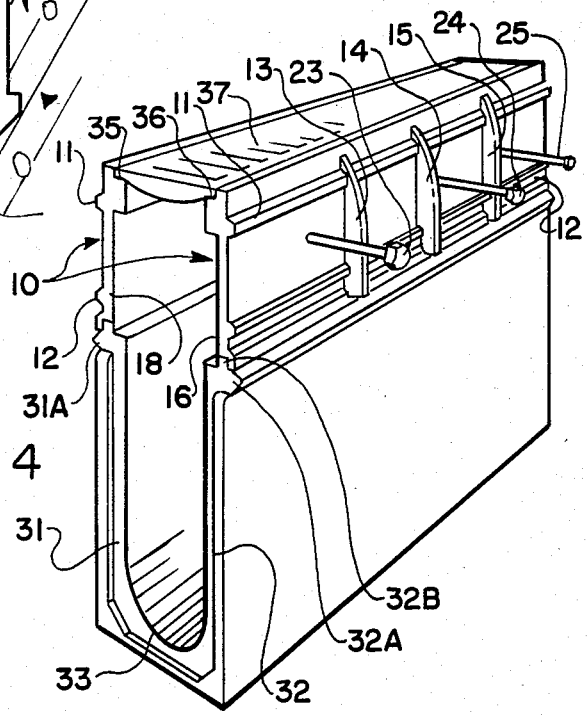
FIG. 4 is a perspective view of a drainage channel segment with two opposing sidewall extensions mounted thereon.

Referring now to FIGS. 3 and 4, sidewall extension 10 is shown in its intended manner of use. Sidewall extension 10 is used in combination with a drainage channel segment 30 formed of cast polyester concrete and having opposing, spaced-apart sidewalls 31 and 32, connected by a bottom wall 33. Sidewalls 31 and 32 and bottom wall 33 collectively define a fluid carrying space having a top opening which is defined between the upper free ends of sidewalls 31 and 32. The upwardly extending ends of sidewalls 31 and 32 define enlarged ribs 31A and 32A, respectively. Integrally formed into the top of ribs 31A and 32A are channel segment ridges 31B and 32B, respectively. When used without the sidewall extensions 10 according to this invention, ridges 31B and 32B define inwardly directed grate support shoulders 35 and 36 into which is placed a suitably formed, elongate grate 37, best shown in FIG. 4.

FIGS. 3 and 4, also illustrate how sidewall extensions 10 fit onto the top of a drainage channel segment 30. Ridges 31B and 32B mate, respectively, with groove 20 in the bottom of two oppositely directed sidewall extensions 10. This establishes the drainage channel segment sidewalls 31 and 32 in the same vertical plane as opposing sidewall extensions 10. It can also be observed that the longitudinally extending ridge 21 on each sidewall extension 10 corresponds exactly in size and shape with longitudinally extending ridges 31B and 32B on drainage channel segment 30. Accordingly, grate 37 fits into the top opening fluid entrance defined by the two spaced-apart, opposing sidewall extensions 10 in exactly the same manner as when drainage channel segment 30 is used by itself.

The construction shown in FIGS. 3 and 4 form a unit which, for all intents and purposes, is a single piece unit, but without the expense and susceptibility to breakage which would result from a single, cast unit of an equivalent size. The bolts 23, 24 and 25 securely anchor sidewall extensions 10 into the surrounding bed of concrete securely and permanently.

Now that the structure of sidewall extension 10 has been explained and the cooperation of two such sidewall extensions 10 with a drainage channel segment 30 has been illustrated, reference is now made to FIG. 5 where the method by which the drainage channel extensions 10 are used is further explained and illustrated.

In FIG. 5 a continuous "run" of interconnected drainage channel segments is illustrated and broadly designated at reference numeral 50. For purposes of explanation, the run is divided into two subsections, respectively identified as subsection 50A and subsection 50B. FIG. 5 has been substantially compressed in longitudinal dimension for purposes of illustration. In reality, each individual drainage segment is 39.19 inches (approx. 1 meter) in length.

In the particular embodiment shown in FIG. 5, thirty individual channel segments, all having the same generic construction as channel segment 30 in FIGS. 3 and 4, are shown in a continuous "run" (subsection 50A) and are identified by reference numerals 51–80. Channel segments 51–80 are of progressively larger capacity beginning with channel segment 51 which, according to this preferred embodiment, has a minimum depth on one end of 5.3 inches (13.5 cm) and a maximum depth on the other end of 5.6 inches (14.2 cm) to provide the 0.6% slope angle. This construction provides a flow cross-section of 12.5 square inches (80.7 sq.cm) and a maximum rate of flow of 128 gallons (485 liters) per minute.

The channel depth of channel segments 51–80 increases progressively, with channel segment 80, the largest, having a minimum channel depth on one end of 12.2 inches (31 cm) and a maximum channel depth on the opposite end of 12.5 (32 cm) inches, to provide a flow cross-section of 39.9 square inches (257 sq.cm) and a maximum rate of flow of 491 gallons (1859 liters) per minute.

In accordance with the illustrated method of this invention, the second run, subsection 50B, constructed of the same exact number of channel segments identified as channel segments 51'–80', is installed in a progressively deeper trench in interlocking relationship with channel segments 51–80. As can be seen in FIG. 5, channel segments 51'–81' thereby defines a predetermined vertically offset distance between the fluid entrance of channel segments 51–81. Of course, subsection 50B can be formed of any number of additional channel segments less than 30 depending on the desired length of the complete run 50.

Identical sidewall extensions 10 are secured to the top of each of the channel segments 51'–80' in the manner illustrated in FIGS. 3 and 4. The top opening which defines the fluid entrance of the drainage channels 51'–80' is at the same level as that defined by channel segments 51–80. As a result, the continuous slope of the run is effectively doubled without the use of interspersed non-sloping channels and without the necessity of individually designing and casting an additional 30, progressively deeper channel segments.

A substantial benefit of this construction and method is a substantial increase in the flow capacity of the system shown in FIG. 5. As indicated above, channel segment 51 has a maximum rate of flow of 128 gallons (485 liters) per minute. Each sidewall extension adds a nominal increase of 7.2 inches (18.3 cm) to the channel depth. Accordingly, the channel depth of channel segment 51 and sidewall extension 10 combined is 12.5 (31.8 cm) inches on one end and 12.8 inches on the other end. This provides a flow cross-section of 41.3 square inches (266 sq. cm) and a maximum rate of flow of 509 gallons (1972 liters) per minute for channel segment 51' and the combined sidewall extension 10. This increase in drainage capacity is quite significant compared to the relatively modest extra cost entailed by use of this product and method.

A drainage channel sidewall extension and a method of extending the continuous slope of a run of a drainage channel system by using sidewall extensions is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. In a drainage channel system of the type characterized by a plurality of drainage channel segments of progressively greater length adapted to be interlocked end-to-end to provide a below grade gravity feed sloping drainage run of a predetermined length, each of said channel segments comprising a pair of opposing, spaced-apart side walls, a bottom wall connecting said side walls adjacent one end thereof, and a top opening opposite said bottom wall, said side walls and said bottom wall defining a fluid carrying space therebetween and said top opening defining a fluid entrance adapted to receive a grate; the combination therewith of a side wall extension for being mounted on top of each of the side walls of the interlocked channel segments along at least a part of the length of the sloping run and effectively increasing the total depth of each said channel segment and increasing the length of a continuously and progressively sloping run of the drainage channel system, each of said side wall extensions comprising a substantially planar body mounted on top of one of the side walls of the channel segment and including means for laterally supporting said planar body in parallel upright relation to said channel segment by engagement with a supporting bed of concrete or the like and without engagement or cooperation with an opposing side wall extension.

2. In a drainage channel system according to claim 1, wherein said side wall extension is mounted on top of said channel segment side wall in substantially the same vertical plane as said channel segment side wall.

3. In a drainage channel system according to claim 1, wherein the top of said side walls of said channel segment and the bottom of said side wall extension includes cooperating positioning means for positioning said side walls and said side wall extensions together in the same vertical and longitudinal plane.

4. In a drainage channel system according to claim 3, said positioning means comprising an upwardly extending ridge integrally formed in the top end of said side walls and extending the length of said channel segment; and the bottom of said side wall extension defining a mating groove extending along the length of said side wall extension for being positioned in stradling relation on said ridge substantially along its entire length.

5. In a drainage channel system according to claim 2, wherein said side wall extension includes locking means for locking adjacent, end-to-end side wall extensions together in the same vertical plane.

6. In a drainage channel system according to claim 5, said locking means comprising a vertically extending tab integrally formed on one end thereof; and the opposite end of said side wall extension defining an integrally formed, mating slot for receiving and locking with the tab on the opposite end of an adjacent side wall extension.

7. In a drainage channel system according to claim 1, 3 or 5, wherein said side wall extension includes at least one integrally formed support rib extending along the length thereof for providing increased stiffness thereto.

8. In a drainage channel system according to claim 7, wherein said side wall extension includes at least one integrally formed, vertically extending buttress for providing increased stiffness to said side wall extension.

9. In a drainage channel system according to claim 8, and including an outwardly projecting, elongate body secured to said side wall extension and extending laterally outwardly therefrom for being imbedded in a supporting bed of concrete or the like in which the drainage channel system is positioned to support said side wall extension.

10. In a drainage channel system according to claim 1, wherein said channel segments and said side wall extensions are each constructed of cast polyester concrete.

11. In a drainage channel system according to claim 1, wherein two opposing side wall extensions mounted on opposing side walls of said channel segment collectively define an upwardly displaced fluid entrance having dimensions substantially identical to that of said channel segment fluid opening, whereby a grate of the same size may be positioned within the fluid entrance of said channel segment and the fluid entrance of said two opposing side wall extensions.

12. A side wall extension adapted for being mounted on top of a side wall of a drainage channel segment of a type characterized by being of a progressively greater depth from one end to the other and adapted to be interlocked end-to-end to provide a below grade gravity feed sloping drainage run of a predetermined length, each of said channel segments comprising a pair of opposing, spaced-apart side walls, a bottom wall connecting said side walls adjacent one end thereof and a top opening opposite said bottom wall, said side walls and said bottom walls defining a fluid carrying space therebetween and said top opening defining a fluid entrance and adapted to receive a grate; said side wall extension comprising a substantially planar body for being mounted on top of respective opposing side walls of the interlocked channel segments along at least a part of the length of the sloping run of said drainage channel system, said planar body further including means for laterally supporting said planar body in parallel upright relation to said channel segment by engagement with a supporting bed of concrete or the like and without engagement or cooperation with an opposing side wall extension.

13. A side wall extension according to claim 12, wherein said side wall extension is mounted on top of said channel segment side wall in substantially the same vertical plane as said channel segment side wall.

14. A side wall extension according to claim 12, wherein the top of said side walls of said channel segment and the bottom of said side wall extension includes cooperating positioning means for positioning said side walls and said side wall extensions together in the same vertical and longitudinal plane.

15. A side wall extension according to claim 14, said positioning means comprising an upwardly extending ridge integrally formed in the top end of said side walls and extending the length of said channel segment; and the bottom of said side wall extension defining a mating groove extending along the length of said side wall extension for being positioned onto in stradling relation with said ridge substantially along its entire length.

16. A side wall extension according to claim 13, wherein said side wall extension includes locking means for locking adjacent, end-to-end side wall extensions together in the same vertical plane.

17. A side wall extension according to claim 16, said locking means comprising a vertically extending tab integrally formed on one end thereof; and the opposite end of said side wall extension defining an integrally formed, mating slot for receiving and locking with the tab on the opposite end of an adjacent side wall extension.

18. A side wall extension according to claim 12, 14 or 16, wherein said side wall extension includes at least one integrally formed support rib extending along the length thereof for providing increased stiffness thereto.

19. A side wall extension according to claim 18, wherein said side wall extension includes at least one integrally formed, vertically extending buttress for providing increased stiffness to said side wall extension.

20. A side wall extension according to claim 19, and including an outwardly projecting, elongate body secured to said side wall and extending laterally outwardly therefrom for being imbedded in a supporting bed of concrete or the like in which the drainage channel system is positioned to support said side wall extension.

21. A side wall extension according to claim 12, wherein said channel segments and said side wall extensions are each cast of polyester concrete.

22. A side wall extension according to claim 12, wherein two opposing side wall extensions mounted on opposing side walls of said channel segment collectively define an upwardly displaced fluid entrance having dimensions substantially identical to that of said channel segment fluid opening, whereby a grate of the same size may be positioned within the fluid entrance of said channel segment and the fluid entrance of said two opposing side wall extensions.

23. A method for extending the continuous slope of a run of a drainage channel system of the type wherein a plurality of progressively deeper channel segments are interlocked end-to-end below grade with a fluid entrance substantially even with grade, each channel segment comprising a pair of opposing, spaced-apart side walls, a bottom wall connecting said side walls adjacent one end thereof, and a top opening opposite said bottom wall, said side walls and said bottom wall defining a fluid carrying space and said top opening defining a fluid entrance adapted to receive a grate, said method comprising the steps of:

a. installing progressively taller channel segments in a correspondingly progressively deeper trench, beginning at one end of a run with a channel segment having predetermined, relatively short side walls and continuing along the run with the installation of a first predetermined number of channel segments having progressively taller side walls to a point before the end of the run;

b. interlocking a channel segment having relatively shorter walls with the tallest channel segment already installed thereby defining a predetermined vertically offset distance between the fluid entrance of the channel segment having the tallest side walls and adjacent channel segment having relatively short side walls;

c. installing a second predetermined number of channel segments having progressively taller side walls for a predetermined distance along the run;

d. affixing a side wall extension on top of each of the opposing side walls of the second predetermined number of channel segments with said side wall extensions each being of a height sufficient to collectively define a fluid entrance at the same level along the continuation of said run for a predetermined distance to the end of said run.

* * * * *